(No Model.) 2 Sheets—Sheet 1.
K. G. JENSEN.
GRAIN MEASURING APPARATUS.
No. 478,111. Patented July 5, 1892.
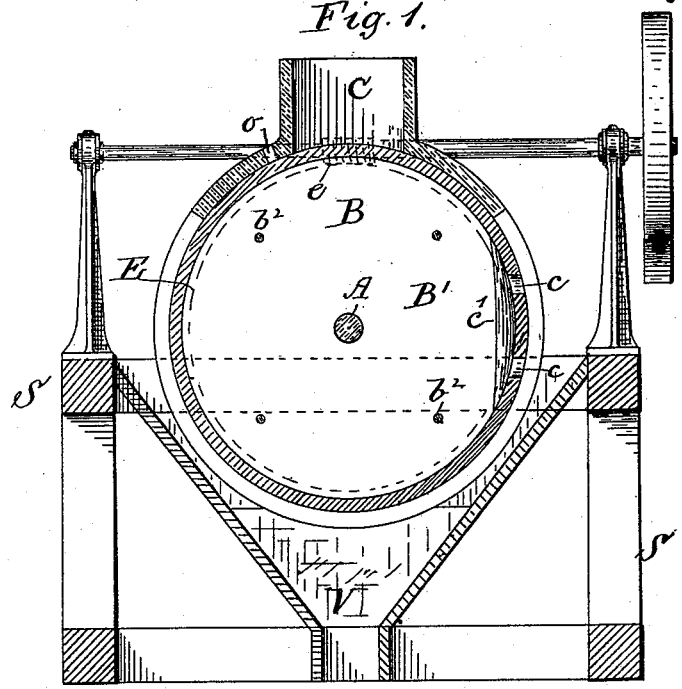
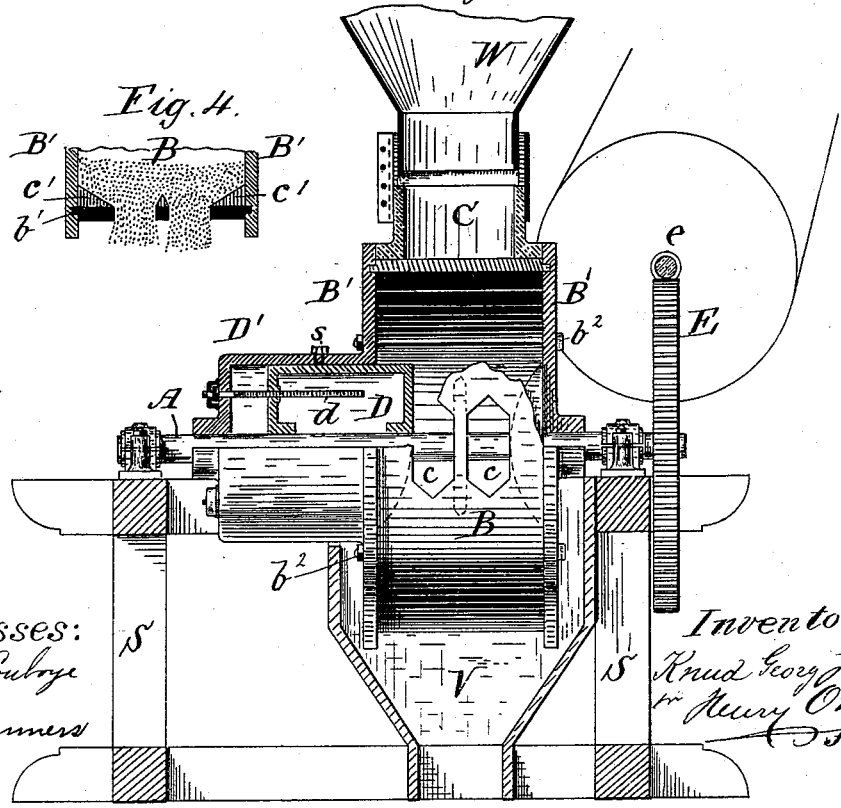
Witnesses:
Chas. W. Coubrye
B. W. Sommers
Inventor:
Knud Georg Jensen
by Henry Orth
Atty.

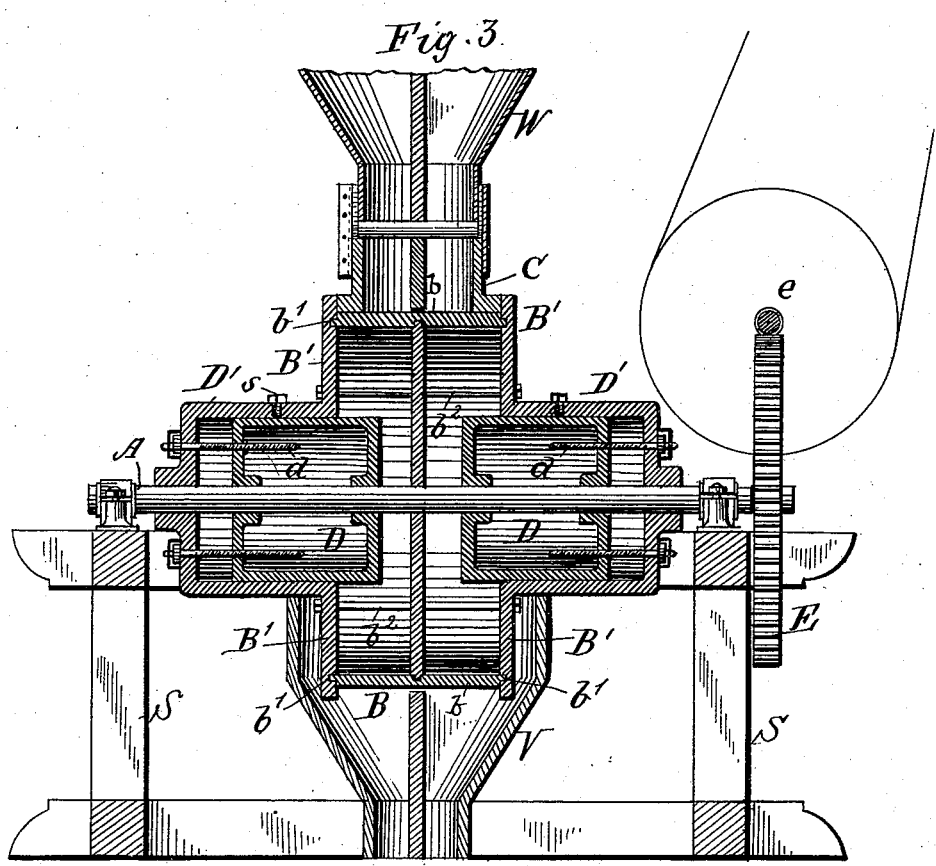

UNITED STATES PATENT OFFICE.

KNÜD GEORG JENSEN, OF CHRISTIANIA, NORWAY.

GRAIN-MEASURING APPARATUS.

SPECIFICATION forming part of Letters Patent No. 478,111, dated July 5, 1892.

Application filed September 19, 1890. Serial No. 365,485. (No model.)

*To all whom it may concern:*

Be it known that I, KNÜD GEORG JENSEN, a citizen of the Kingdom of Norway, residing at Christiania, in the Kingdom of Norway, have invented certain new and useful Improvements in Self-Acting Measuring Apparatus for Grain and Similar Substances; and I do hereby declare the following to be a full, clear, and exact description of the invention, such as will enable others skilled in the art to which it appertains to make and use the same.

The invention relates to grain-measuring apparatus, and has for its object to provide an apparatus of simple construction, accurate in its operation, and not liable to disarrangement.

To these ends the invention consists in a revoluble measuring-vessel provided with one or more apertures for the introduction and discharge of the grain, in means for varying the capacity of the cylinder, and in means for connecting the cylinder with the feed-spout, as will now be fully described, reference being had to the drawings hereto annexed, in which—

Figure 1 is a vertical longitudinal section, and Figs. 2 and 3 are similar transverse sections, of a grain-measuring apparatus constructed according to my invention; and Fig. 4 is a sectional detail view.

Similar letters indicate like parts wherever such may occur in the several figures of the drawings described.

The apparatus is supported from a suitable frame-work S, in which is also arranged the hopper V, that receives the measured charges of grain and discharges the same into any suitable receiver, and W is the feed-spout, which is connected with a bin or other suitable holder for the grain in bulk.

The measuring device or apparatus consists simply of a cylinder B, that is preferably constructed of cast-iron or strong sheet metal and is composed of a cylindrical body $b$, connected by tongue-and-groove joint $b'$ with the heads $B'$, the whole being united by tie-rods $b^2$. The cylinder B is provided with one or more openings $c$, and if more than one opening is provided said openings are arranged side by side, as shown in Fig. 2. These openings $c$ have preferably the form shown in said Fig. 2—that is to say, their lateral walls near the opposite ends converge to an acute angle that lies in the plane of rotation of the cylinder. In practice I have found this form of opening the best, for the reason that the grain is at first gradually admitted to said openings, the cut-off taking place in a like manner, thereby avoiding the danger of choking by a large mass of grain above the openings as they pass under the hopper. The cylinder is provided interiorly with guide-ribs $c'$, converging toward the openings to insure the discharge of all the grain when said openings reach a proper position during the revolution of the cylinder B. The cylinder is mounted on a shaft A and revolved by any suitable mechanism—as, for instance, a worm-wheel E may be secured to shaft A and driven by a worm $e$ on a driving-shaft that carries the driving-pulley. It will, however, be understood that any other driving mechanism may be adopted to drive the cylinder at any desired or proper speed, care being had, however, that the speed be a constant or unvarying one, in order to insure accurate measurements.

The capacity of the cylinder is preferably a variable one, and in order to accurately vary the capacity I provide the following means: The measuring-cylinder is provided with a cylindrical extension $D'$, in which is arranged a piston D, that is mounted and has motion lengthwise on shaft A and is adjusted by means of adjusting-screws $d$, working in threaded bearings in the outer wall of the piston, as shown in Fig. 2. It is obvious that by manipulating the adjusting-screws the piston D may be moved into the cylinder B to a greater or less extent, thereby reducing its capacity. The measuring-cylinder being of known capacity and the piston of a known circumferential area, the adjusting-screws may bear an index giving the capacity of the cylinder B for any adjustment of the piston, and in order to avoid the separate manipulation of the several screws $d$, of which there are four in the construction shown in order to impart a perfectly-rectilinear motion to the piston, the said screws may be geared together in a well-known manner, so as to revolve synchronously. The piston is locked into the adjusted position by one or more set-screws $s$.

To prevent the spilling of the grain as it passes from the feed-chute W to the measuring-cylinder, I employ an intermediate device, which I call the "striker" piece or plate C, that has an extension of the form of the lower end of the feed-chute, either cylindrical or polygonal, and fits into said chute, the plate being concave, so as to fit the periphery of the measuring-cylinder accurately and is preferably made sufficiently heavy to firmly seat on the said cylinder.

In order to allow the air in the measuring-cylinder to be rapidly exhausted as the grain is fed thereto, I provide two holes o, Fig. 1, formed in the striker-plate C, close to the extension, so that as soon as the grain begins to pass into the cylinder the air displaced will rush out of said holes.

In conjunction with my improved measuring-cylinder any well-known registering mechanism may be used and operated by a tappet on the measuring-cylinder, or such tappet may be made to operate the hammer of a bell to give an audible signal at each revolution of the cylinder, or both a registering mechanism and an audible signal may be used to indicate each measurement.

From the above description of the construction of my improved automatic grain-measuring apparatus its operation will be readily understood without further description.

In the use of an audible indicator such as above referred to I prefer to locate the gong or bell at the source of supply of the grain and operate the same electrically in any well-known manner and so that the gong or bell will be sounded a little before the measuring-cylinder reaches a position at which the contents are discharged into the receiving-hopper V, so that the attendant at the source of supply will be enabled to keep up the supply of grain to the feed-chute to avoid the measuring-cylinder running empty. Of course the capacity or the different capacities of the cylinder being known, as well as the weight of a given quantity of grain to be measured, the weight of each quantity measured can be readily ascertained.

Instead of providing means for varying the capacity of the measuring-cylinder, as hereinabove described, the cylinder may be divided into two or more compartments either in the plane of its axis or in a plane at right angles thereto. In the former case each compartment will have its filling and discharge aperture receiving the grain from the same feed-chute. In the latter case—namely, when the cylinder is divided by a partition lying in a plane at right angles to its axis—the grain may be supplied from a single feed-chute or from two feed-chutes, the striker-plate extension being correspondingly divided, and the grain supplied may be emptied into a divided receiving-hopper having separate discharge-spouts, so that two species or varieties of grain can be measured simultaneously. With a cylinder so divided the regulating-piston D may also be employed, one for each compartment being provided in this case.

It will be seen that the apparatus is of the simplest construction, hence not apt to wear or get out of order, and practical tests have demonstrated the accuracy of the measurements and the fact that the cylinder will always fill, even if revolved at a comparatively high speed.

I have described a measuring-vessel of cylindrical form; but such form is not absolutely necessary, and the measuring-vessel may be of other form in cross-section—as, for instance, in the form of a polygonal drum. I prefer the cylindrical form for the reason that the curvature of the interior surfaces promotes the flow of grain from the cylinder, as is well understood.

Having described my invention, what I claim is—

In a grain-measuring apparatus, the combination, with a revoluble measuring-vessel having one or more peripheral openings for the reception and discharge of the grain, a stationary feed-hopper provided with bearing-flanges bearing on the outer periphery of the vessel and having air-vents adapted to register with said openings in the measuring-vessel, an axial piston D, adapted to be projected more or less into the vessel, adjusting-screws $d$ for adjusting said piston relatively to the vessel, and a locking device $s$ for locking the piston against displacement when adjusted, said parts being constructed and arranged for operation as described.

In testimony whereof I affix my signature in presence of two witnesses.

KNUD GEORG JENSEN.

Witnesses:
  JOHAN A. ANDRESEN,
  LARS AUENSEN.